United States Patent
Manto

(10) Patent No.: US 6,584,183 B2
(45) Date of Patent: *Jun. 24, 2003

(54) SYSTEM AND METHOD FOR PROVIDING SPONSORED OF UNIVERSAL TELECOMMUNICATIONS SERVICE AND THIRD PARTY PAYER SERVICES

(76) Inventor: Charles L. Manto, P.O. Box 144, Alexandria, VA (US) 22313

( * ) Notice: Subject to any disclaimer, the term of this patent is extended or adjusted under 35 U.S.C. 154(b) by 0 days.

This patent is subject to a terminal disclaimer.

(21) Appl. No.: 09/942,930

(22) Filed: Aug. 31, 2001

(65) Prior Publication Data

US 2002/0025028 A1 Feb. 28, 2002

Related U.S. Application Data

(63) Continuation-in-part of application No. 09/193,732, filed on Nov. 17, 1998, now Pat. No. 6,285,749.

(51) Int. Cl.[7] .............................................. H04M 15/00
(52) U.S. Cl. ........................... 379/114.05; 379/114.01; 379/114.03; 379/114.1; 379/114.21; 379/114.23; 379/201.01
(58) Field of Search ........................... 379/111, 114.01, 379/114.03, 114.05, 114.1, 114.12, 114.15, 114.2, 114.21, 114.22, 114.23, 114.24, 114.25, 114.26, 115.01, 121.01, 112.02, 144.01, 188, 201.01

(56) References Cited

U.S. PATENT DOCUMENTS

| | | | | |
|---|---|---|---|---|
| 5,333,186 A | * | 7/1994 | Gupta | 379/201.01 |
| 5,579,379 A | * | 11/1996 | D'Amico et al. | 379/114.01 |
| 6,195,422 B1 | * | 2/2001 | Jones et al. | 379/144.01 |
| 6,285,749 B1 | * | 9/2001 | Manto | 379/114.23 |
| 6,314,163 B1 | * | 11/2001 | Acampora | 379/56.2 |
| 6,415,024 B1 | * | 7/2002 | Dunn et al. | 379/114.05 |

OTHER PUBLICATIONS

Fujioka et al, Universal Service Creation and Provision Environment for Intelligent Network, IEEE Communications Magazine, Jan. 1991, pp. 44–51.*

* cited by examiner

Primary Examiner—Curtis Kuntz
Assistant Examiner—Quoc D Tran
(74) Attorney, Agent, or Firm—Greenburg Traurig; Richard E. Kurtz, II

(57) ABSTRACT

A method of operating a telecommunications device wherein the telecommunications device is used to detect an outgoing call from a calling party to a called number. The calling number is used to determine whether or not the calling party is a universal service user. If it is determined that the called number is among a class of numbers exempt from charges, the call is connected. A determination on the sufficiency of funds in a pre-paid account is made. If it is determined that there are insufficient funds in a pre-paid account to cover charges associated with the outgoing call, a message is generated and sent to the calling party or a third party requesting authorization to charge an additional fee for connecting the calling party with the called party. User input is received from the calling party, indicating the calling party's authorization of such charge. The connection between the calling party and the called party is made. In an alternative embodiment, costs for providing data communications between an initiating party and a universal service user are calculated, in response to a request by the initiating party, in accordance with the network elements required for a requested quality of service.

22 Claims, 6 Drawing Sheets

Service Assessment Routine

SYSTEM AND METHOD FOR PROVIDING SPONSORED OF UNIVERSAL TELECOMMUNICATIONS SERVICE AND THIRD PARTY PAYER SERVICES

This application is a continuation-in-part of U.S. patent application Ser. No. 09/193,732, filed Nov. 17, 1998, now U.S. Pat. No. 6,285,749, the entire disclosure of which is incorporated herein by reference.

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

The present invention relates in general to the field of voice and data communications, and in particular to a novel system for providing sponsored or universal communications services.

BACKGROUND OF THE INVENTION

Over the years, worldwide consideration has been given to the universal service problem—the desirability of providing telephone service to those who cannot afford to pay and maintain telephone service. Networks are significantly more valuable as more users are able to use the network, and the lack of universal service is a barrier to economic participation by those lacking service. Societal benefits of having even the poorest on the public telecommunications network are so significant that the new U.S. Telecommunications Act of 1996 makes special provisions for universal service as part of the Act, including mechanisms to implement subsidized activities. Many states have life-line services which subsidize telecommunications services for users who meet certain low income tests.

Internationally, there are even larger universal service problems as nations such as the Philippines, China, and the republics of the former Soviet Union try to entice investment in their respective telecommunications infrastructures. In these emerging markets, the number of telecommunications lines per capita is much smaller. Because market-based solutions to the universal service problem in these markets are lacking, capital for network infrastructure is limited.

Therefore, there is a need for an improved apparatus and operating methodology that provides a market-based solution to the universal service problem.

SUMMARY OF THE INVENTION

In a preferred embodiment, the invention provides a novel and substantial solution to the problem of providing phone service for those without proven means to pay or enables sponsors wishing to pay on behalf of others, by providing, voice, data, and multi-media services. The invention provides an apparatus and a related method for controlling public network switching activity in a manner which makes it possible to provide universal service, by providing a telephone line to a party without charge, and providing metered billing to persons wishing to contact the party. This method effectively provides universal service for telecommunications voice and/or multimedia applications, without tax or market subsidies.

BRIEF DESCRIPTION OF THE DRAWINGS

The foregoing and other objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention.

DETAILED DESCRIPTION OF THE PREFERRED EMBODIMENT

Figure 1A:
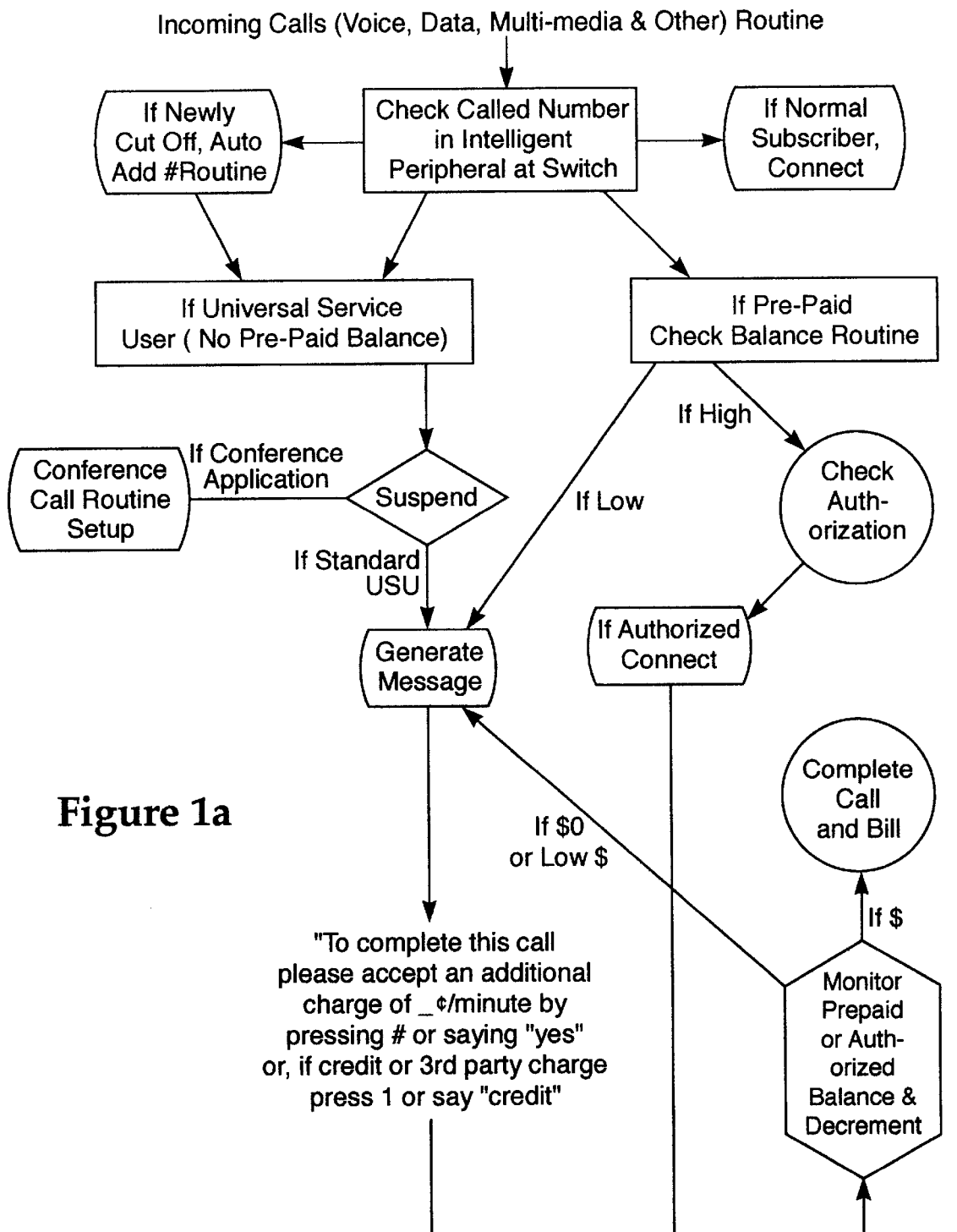
FIG. 1 is a flowchart showing an inventive process for delivering Incoming Calls to a Universal Service User.

Reference will now be made in detail to the preferred embodiments of the present invention, examples of which are illustrated in the accompanying drawings.

The present invention provides software operating in telephone central office switches and/or their intelligent peripherals. Such operating software may also be installed in other network devices for wireline and wireless local loop services and long distance services, in user equipment including switches, PBX's, telephony systems, controlling local area networks, and wide area networks, and to provide universal access to portable telephones, pagers and other electronic communications devices. This would include policy or security servers or remote mass storage systems.

The present invention makes it possible to include far more people in a given network, and also makes it possible to simplify participation of multiple local and long distance service providers in any given market.

The invention will be described in terms of a preferred embodiment in which telephone service is provided that is totally free to the user, yet is paid for by third parties.

However, those skilled in the art will understand that the inventive concepts can be similarly applied to billing and connection services for other communications networks.

This invention further provides a virtual real-time wideband assessment routine which manages information from network monitoring and management software programs, telecommunications service activation software programs, service level agreement software programs, and cost model programs that make it possible to know all available last mile network and backbone network alternatives and their pricing and provide it to prospective sponsors on demand so that the sponsoring party can decide whether to commit to pay for the wide bandwidth service. This embodiment is discussed in detail farther below.

Now, whenever a telephone user is about to be cut off from service, the software according to the invention will make it possible to cut the user off from credit incurring calls while still maintaining their service. The software still allows the user to place collect calls, 1-800 or 1-888 calls, 911 calls, or third party charge calls, resulting in revenue to the service provider from third parties. Furthermore, this software will intercept incoming calls before completion and ask the caller to decide if they wish to complete the call to the free user, on the condition that the caller pay an extra premium of, for example, a defined price per minute. When the user accepts this offer and demonstrates ability to pay either through their own credit based phone bill, their pre-paid phone bill, or some other acceptable credit or debit means, then the caller is allowed to complete the call to the user. Once the call is completed, the caller is billed for the additional fee, making it possible for the service provider to the user of free phone service to make a profit, thus providing a market based mechanism to provide universal service. This concept is preferably implemented, according to the present invention, using control and billing software particularly adapted for this purpose.

Additionally, when a very wide bandwidth call needs to be made, the sponsor needs to know the bandwidth and quality of service available and the time of day and duration for which the bandwidth and quality of service will be available from which sources and at what price. Therefore, there is value in having an assessment routine which continually monitors and models the costs from all available and relevant network elements to provide the service. This would include monitoring and modeling the elements and prices of the local network elements in addition to the long haul network elements so that the sponsor can understand the most effective and least cost alternative for the specific service on a case by case basis when it is needed.

Without this capability, the universal service can be provided, but, at a less robust cost and service level opportunity. With this capacity, multiple networks and service providers can be used to offer the best possible service for the user and sponsor while providing for additional competition in the telecommunications market place.

With the control and billing software configured according to the present invention, it is possible to roll out new phone service to users who normally cannot afford to establish phone service. This is true both in U.S. and emerging markets world wide. This provides a significant advantage, making existing networks more viable, and making it possible to finance new networks at an accelerated rate. More users, whose bills will be paid by willing third parties, will make it possible for companies to meet return on investment targets earlier than would otherwise be possible.

Furthermore, network service providers will be able to connect more users sooner at a more cost effective rate. For example, when a service provider comes into a new neighborhood, the service provider can wire up an entire community instead of only the portion of the community that can meet credit standards. This is a problem not only for domestic cable television operators, and new competitive local exchange carriers but for both incumbent and alternative local exchange carriers overseas. Up until now, a new service provider brings infrastructure to anywhere between twenty and eighty percent of the local population, and then goes back on a case by case basis to add additional customers. With this approach, the new service provider can provide user connections to an entire community at once, at far less cost than sending in technician teams later, by offering non-credit service to those who do not meet a predetermined credit or debit standard.

This feature enabled by the present invention makes it possible for much desired competition to develop sooner. Users who normally can pay a subscription fee for one service provider may not switch to another, and certainly would not want to use two suppliers, may consider using a second supplier for certain services if the basic service is either free or paid by third parties. These third parties may either be callers, advertisers, or other financially interested parties. This will also foster competition and infrastructure investment since this will allow new Local Exchange Carriers (LECs) to offer services with confidence that the bills will be paid by someone with established credit or debit relationships. This is a substantial problem both for traditional CLECS and large users who may elect to become CLECs.

An example of the benefit of this approach to other financially interested third parties is its application to providers and payers of medical services. In the case of a poor elderly patient, the patient today may require hospital admission for special observation, at a cost of tens of thousands of dollars. Using the present invention's approach to telecommunications control and billing, it will be possible to save the medical services payer from substantial costs by making use of high bandwidth multi-media telecommunications universal service applications. This would even be true for those with no ability to pay for even a standard voice subscription, let alone high or very high bandwidth lines. In the case of the indigent elderly, both normal and high bandwidth media lines may be available to the resident, since everyone in the community can be wired for all new services as they become available in a neighborhood.

When it becomes apparent that the indigent elderly resident needs special medical observation, the provider and payer of medical services may find that it is more effective and less expensive to have home health care nurses provide service and hook up medical diagnostic and monitoring equipment through the high bandwidth communications lines between the patient and the hospital. As long as the payer finds that the monitored home health care costs are lower, the medical service provider/payer will be more than happy to pay for the additional communications costs, since they will save far more than they will spend.

The present invention has particular application to organizations which may become part of competitive local exchange carrier partnerships, including hospitals, universities, local governments, hotels, and other large users. The benefits to these organizations include billing protection from the bad debts usually associated with the launch of a new telecommunications product or market.

The third party payer software capabilities according to the present invention can also be tied into normal credit, new debit, and prepaid options. In this way, customers who start with either a credit standing, and fail to pay their bills, can automatically be switched to the "free universal service" plan, or one with a pre-paici service can be switched to the "free universal service" plan should their pre-paid funds run out.

The features of the present invention make it possible to service the poor without requiring them to meet income tests. In many cases, life line service is of no value to the poor because the poor often don't know about the life line program in the first place, don't know how to apply, find their applications slow to be approved, or find that they don't meet a particular requirement, though they still cannot afford the service.

The software according to the present invention will now be described in more detail with reference to FIG. 1, which is a flowchart showing an inventive process for delivering Incoming Calls to a Universal Service User. This software is implemented as part of a conventional call processing and control system in, for example, a central office switch.

Figure 1B:
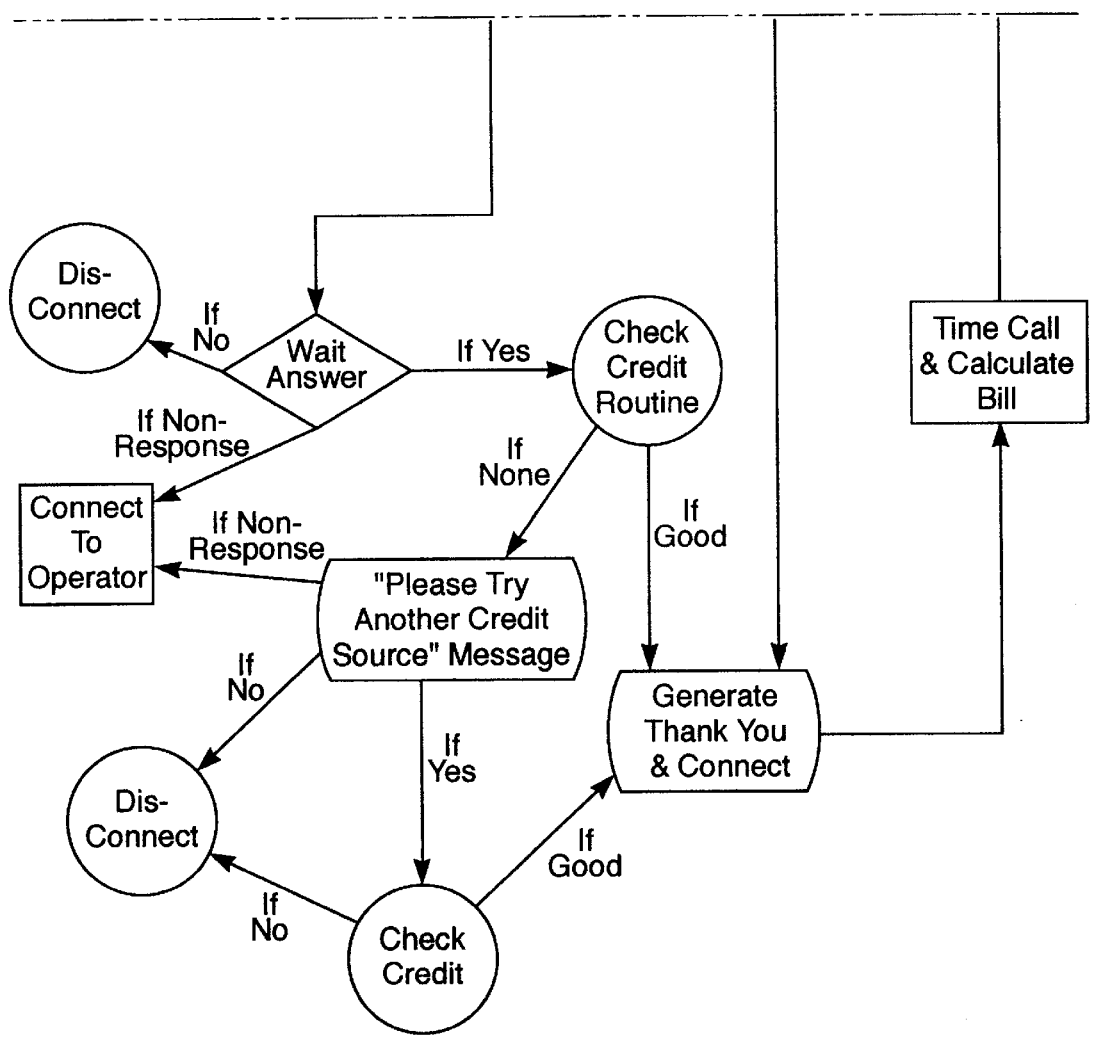

As shown in FIG. 1, when the calling party initiates a call to a universal service participant, the calling party's call will be intercepted by the local exchange switch or is intelligent peripheral to see if the called party is a Universal Service User (with either non-subscriber or special subscriber status such as a pre-paid status). If a call is not connectable by a local switch, it will also be diverted to the Universal Service User Data Base so that the unserviceable number can be added to the USU set-up routine so that the caller may be able to complete the call. When the called party is determined to be a Universal Service User, the account will be examined to see if it is a pre-paid account or not. If it is a pre-paid account, the balance will be checked to see if there is enough funds in the account to cover the call. If there is sufficient funds in the account, then the call is completed unless it must first go through an authorization routine described below.

If there are not enough funds in the account, or, if a pre-paid account is not established, then the calling party will, before the call is completed, hear a voice on the line (or see a message or receive an indication one way or another) that will inform the caller that they are reaching a number which requires an additional payment of x cents per minute to complete the call or service in the case of a multimedia call or other service. By pressing the # key, or by saying "yes", they are indicating willingness to pay the additional charge. Once the party has agreed to the charge, (and the ability to pay is confirmed) the call is then completed and the call is billed to the paying party or parties.

In this way, the called party with free phone service receives the call, and the service provider paying for the free service can recoup its investment in providing this access. The software both interrupts the caller, queries the caller, determines whether to complete the call by seeing if the caller is willing and in many cases able to pay for the call, completes the call, and then bills the call.

The software may also provide for any call forwarding or earmarking of users who are identified as universal service clients, and any other requirements that may be established in the negotiations that are required between incumbent local exchange carriers (ILECs) and competitive local exchange carriers (CLECs).

The present invention also provides processing for incoming calls to pre-paid accounts, and a setup to transfer to Universal Service User (USU) Status. The Universal Service User may also be provided with monthly subscription services and/or measured services prepaid by the Universal Service User, or by third parties. When calls come into such an account, the prepaid account may be checked for an account balance to see if the call or service can be completed and paid by the funds left in the pre-paid account. If the account is sufficient, the call or service is completed and monitored for account balance in real time, but if the account is depleted or low or becomes low during the call, then the message to the caller is generated, requesting that the caller agree to pay to complete the call or service. (This allows for prepaid accounts with or without prepaid cards that are payable by third parties, not just the user, and allows the prepaid user to continue using telephony service once the prepaid account is depleted.)

The present invention also provides a mechanism for processing incoming calls to pre-paid accounts for restricted or authorized users. The value of this type of third party paid account is that the payer of the account can restrict the availability of those calls to callers that are authorized to make certain types of calls which can be verified either by a personal identification number (PIN) or digital signature. In this way, calls can be paid for by a medical plan that will cover authorized calls to the user by authorized medical personnel attempting to deliver services to the Universal Service User. The same type of service may be available to government agencies attempting to contact or deliver services to the Universal Service User. The service may be paid by one agency but usable by other authorized agencies. Similarly, teachers in school systems may be authorized to call their students or the students' parents. Again, security codes such as PIN numbers, digital signatures, smart cards, interactive video, or other security systems including but not limited to pseudo-random number generators, finger print, bio-feedback, infrared scans of capillary heat generation, retina scans, etc. can be used as means to verify authorized users.

The present invention also provides an improved processing method for automated conference calling for medical, research, public safety and security applications. Users can be identified for operation of an automatic conference call application such as a research or medical application needing connection to multiple health care providers, or, by authorized law enforcement agencies with warrants for legal wiretaps so that when a call is placed to such a user, instead of having the call suspended and given the voice message that an additional charge is required, it can be tied in as a conference call to a law enforcement recording device that would enable the collection of telephonic evidence. This would allow for tapping of the call without substantial effort by the carrier or investment by the government, producing savings estimated at over $500,000,000.

Figure 2A:
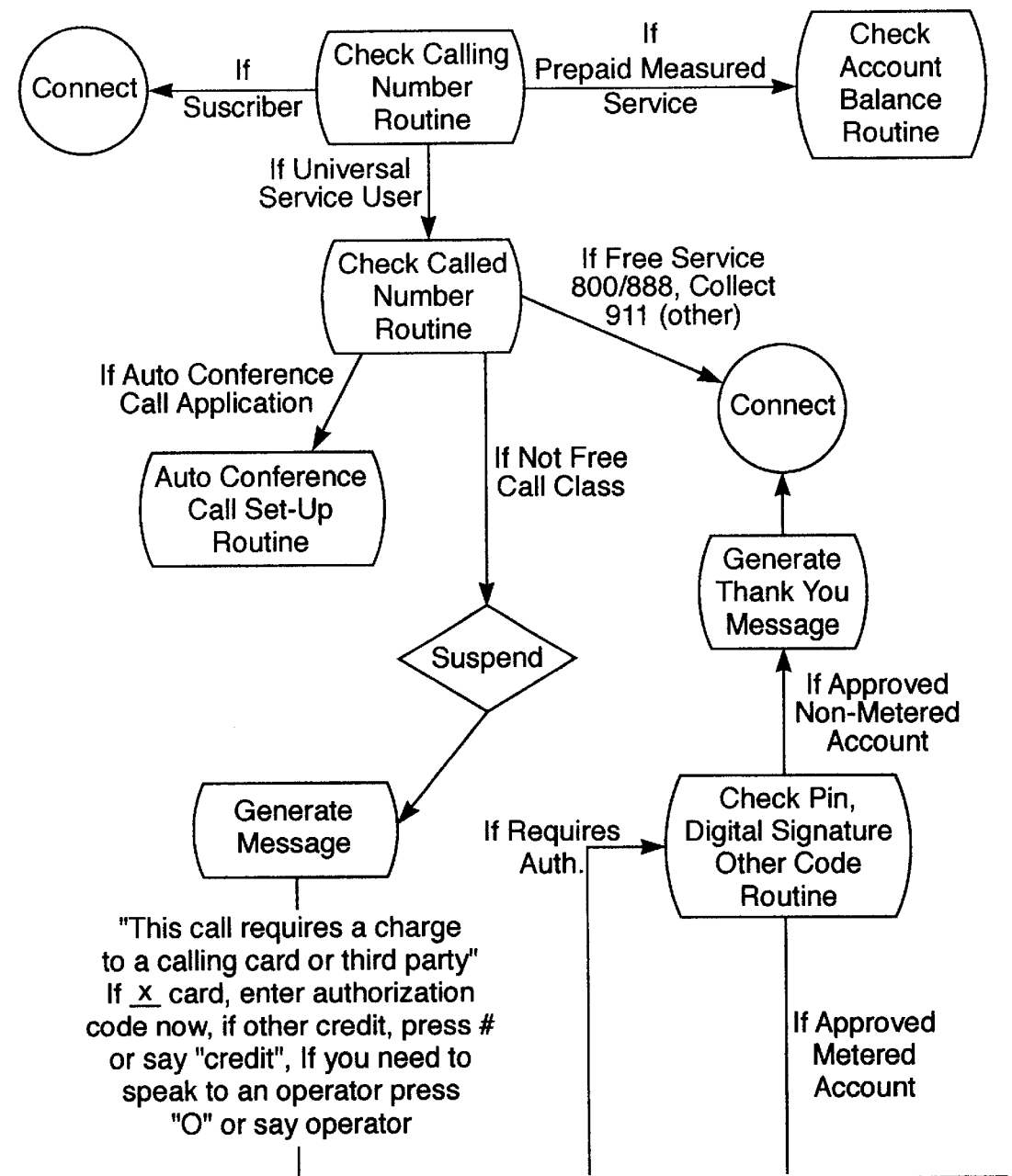
FIG. 2 is a flowchart showing an outbound calling process according to the present invention.
Figure 2B:
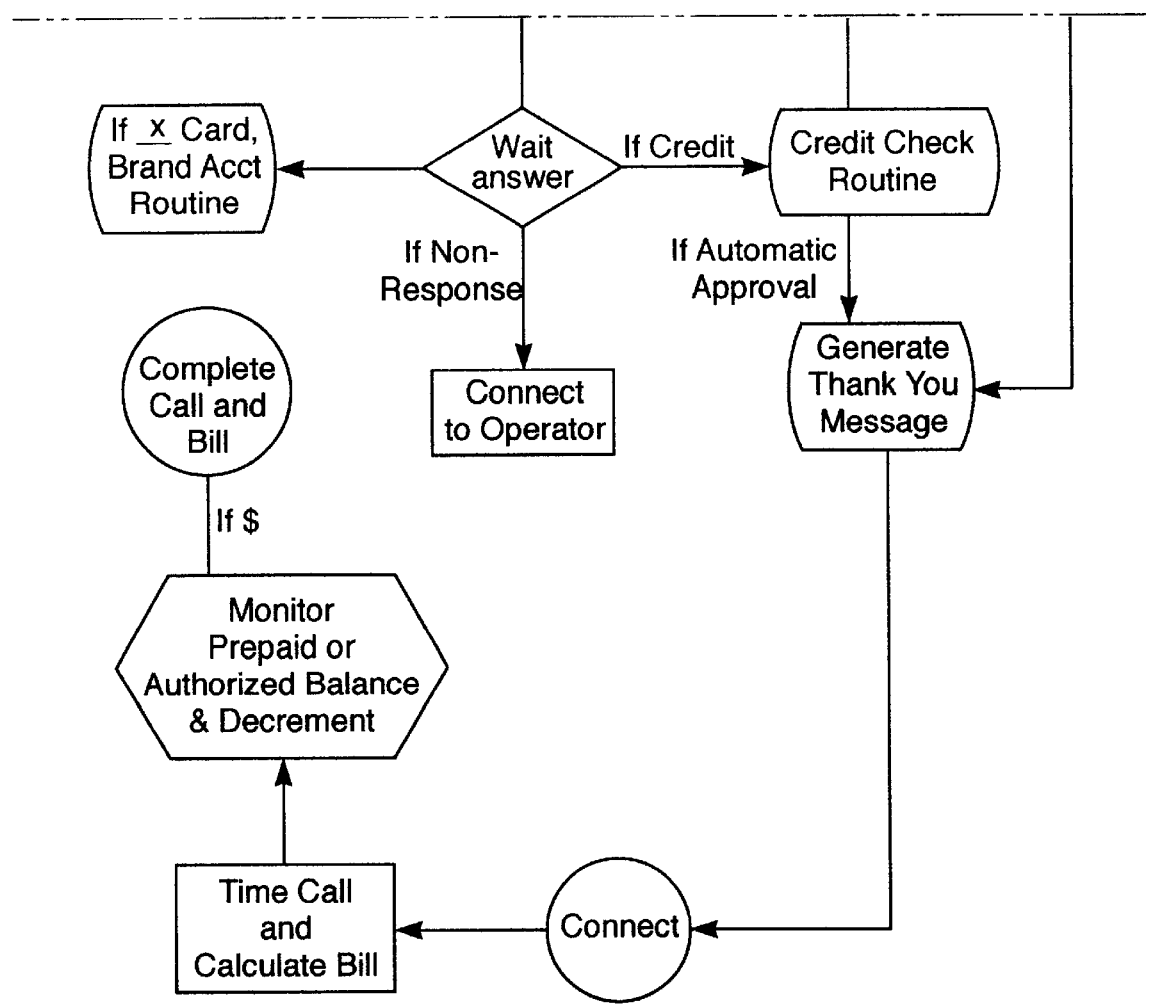

The present invention also provides a novel software application and mechanism for controlling and billing outgoing calls from Universal Service Users. A preferred embodiment of this mechanism will be described with reference to FIG. 2, which is a flowchart showing an outbound calling process according to the invention. When the universal service participant makes calls, they are restricted to collect calls (including local), or other third party payer arrangements such as toll free or 911 calls. However, they may also elect to arrange for pre-paid services which may provide certain services until those funds are used, at which time, the Universal Service User reverts to the non-credit/debit call restrictions. These pre-paid services may either be subscription-based or measured services.

The measured services, such as long distance, may be limited to pre-paid limits or to specific numbers or by specific uses and or users determined by PIN codes, digital signature, or other security measure described above. This will be able to account for multiple users at a location or household with different authorization levels which will eliminate unauthorized use of credit, which is one of the reasons why many users have bills they cannot subsequently pay.

This will also make it possible for users to be authorized on the condition that they call pre-identified numbers from any location or phone account that can be billed to third parties with financial or other incentives to sponsor the call. For example, a pizza delivery service or a personal injury lawyer may establish an agreement with the service provider to pay for any incoming calls to their office initiated by Universal Service Users, in the expectation that such calls will provide business opportunities.

The software which intercepts the call is preferably either in the switch or in an intelligent peripheral of the local service provider, even if the local service provider is a Competitive Local Exchange Carrier and User Facility. This software may also be located elsewhere in the network or the user premise equipment, or in some combination of the network elements. What is important is that the Universal Service User be provided with access to a communications network, such access in some cases being is usable only when a third party wishing to call or to receive calls from the USU has agreed to pay a fairly substantial metered or fixed rate for placement of the call.

Figure 3:
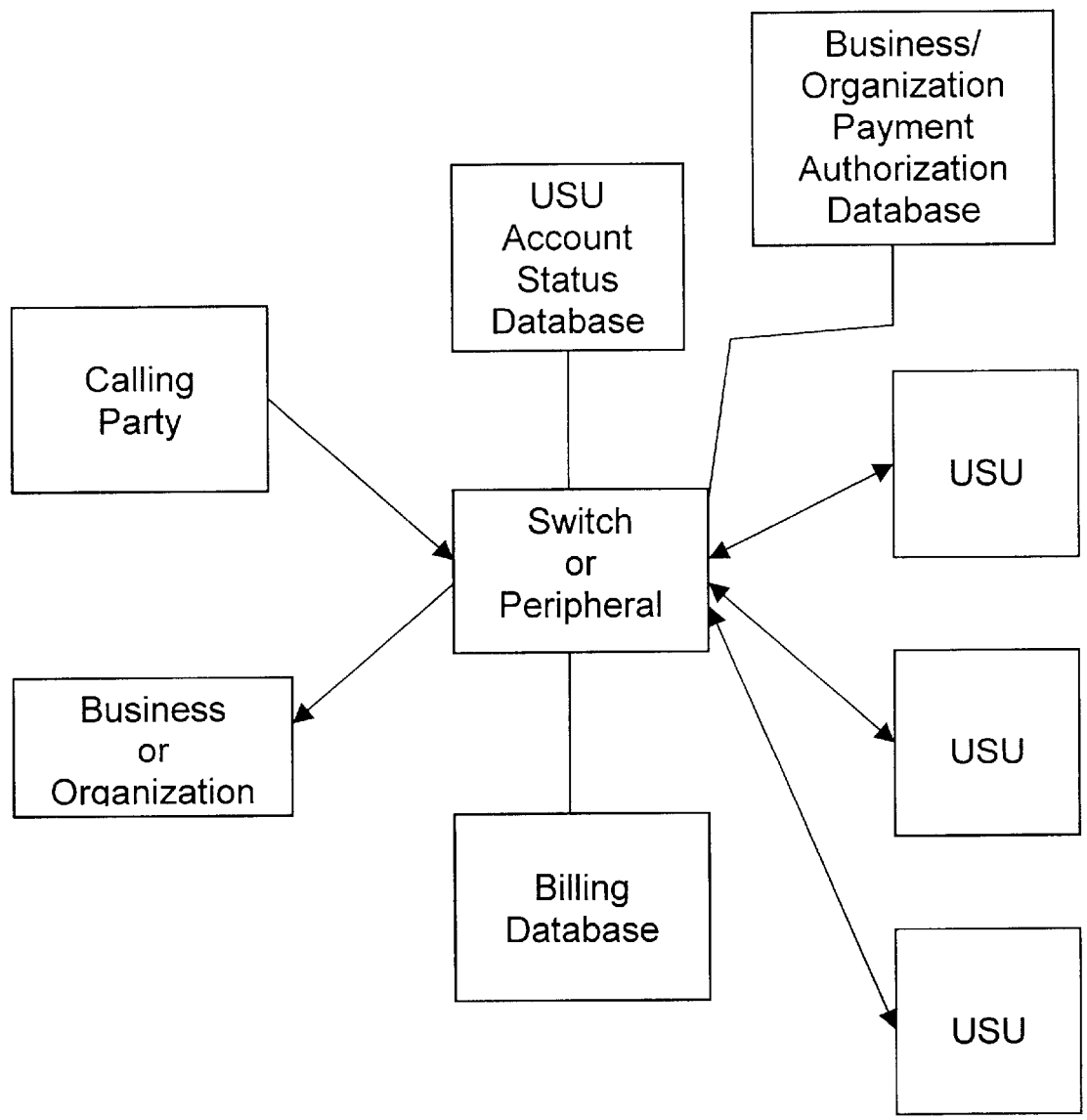
FIG. 3 is an illustration of a simplified block diagram of the preferred embodiment of the switching system according to the present invention.
Figure 4:
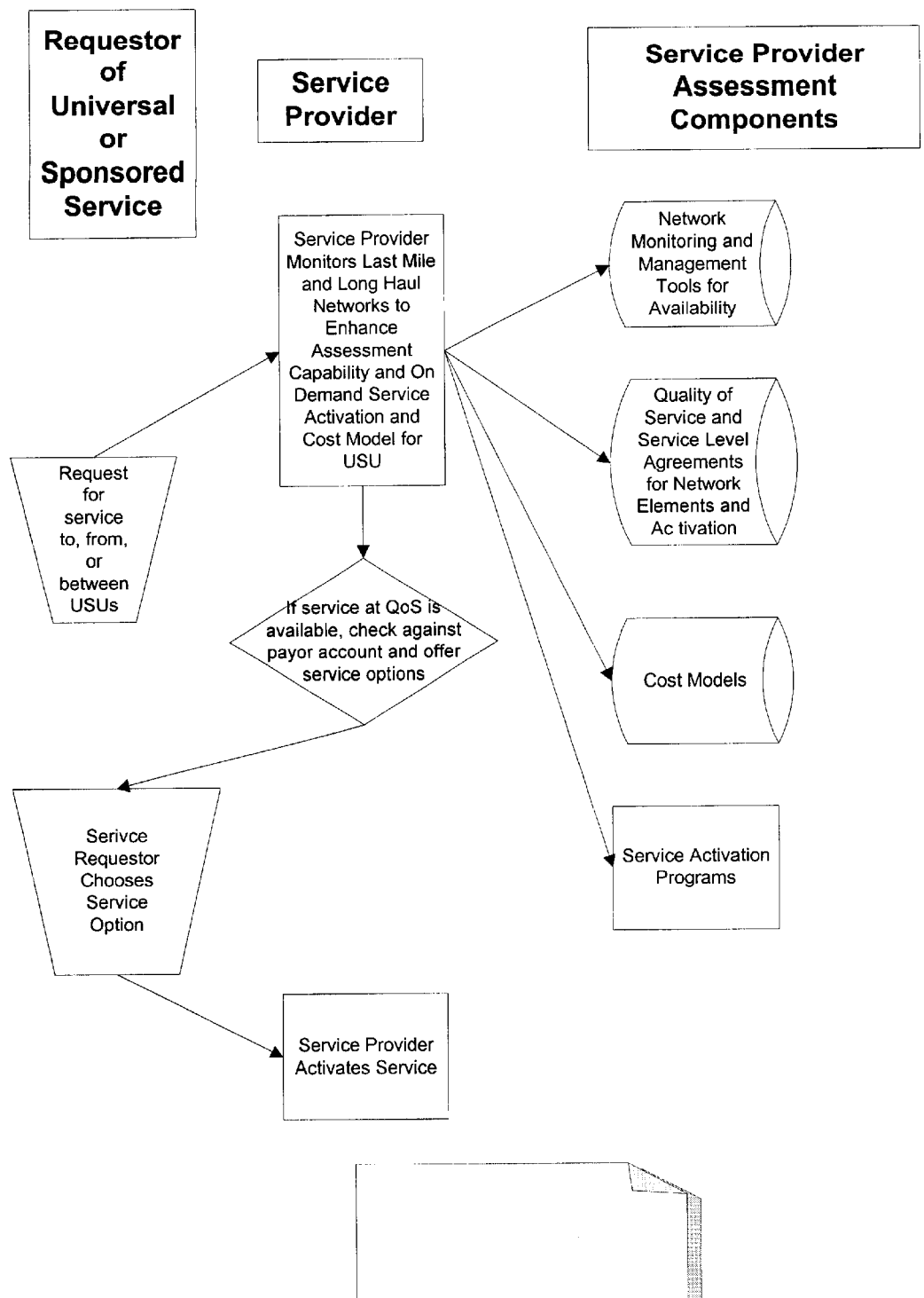
FIG. 4 is an illustration of a simplified block diagram of the preferred embodiment of the sponsored or universal service virtual real time wide band assessment routine.

FIG. 3 is a simplified block diagram of a preferred embodiment of the switching system according to the present invention, which implements the processes described herein. The switch is connected to USUs and other users, and to various calling parties wishing to place calls to USUs. The switch is also connected to various parties who may have arranged, or be willing to arrange, to pay the expenses involved in receiving calls from USUs. The switch has associated with it a billing database for storing billing information and generating bills and credit reports, a USU account status database for determining the prepaid status of a USU account, if any, and a payment authorization database for recording authorizations by businesses and other organizations. These authorizations may include either generally authorizing payment for USU-originated calls to a certain number, authorization for certain outgoing calls to the organization or other predetermined numbers, authorization for certain payment codes to be effective to place a call to a USU, and other authorizations described above.

The present invention may be applied in a business plan application according to the following discussion.

This business plan proposes the creation of C-LECs with major users such as hospitals, universities, and local government agencies (HUGs) as co-owners. This enables users to turn cost centers into revenue centers with the possibility of entirely offsetting their current costs while out-sourcing the management and financing to the joint venture. For infrastructure based C-LECs, this approach attracts joint venture participation with large users that will quicken market entry, profitability, and rights of way acquisition. Creative third party billing techniques will protect the C-LECs or their partners from bad debts and make it possible for ILECs to use CLECs to help collect their own bad debt. Prospective industry partners are leaders in C-LEC management.

Regulatory restrictions on local phone service changed significantly in 1996 when Congress enacted The Telecommunications Act of 1996. The Act opened the way for the incumbent local exchange carriers (ILECs) to get into the long distance business if they allowed competition in their local phone markets.

Before they enter the long distance market, The Telecommunications Act of 1996 requires the incumbent local exchange carriers (I-LECs) to satisfy fourteen conditions designed to help competitive local exchange carriers, or C-LECs, enter the local phone market. Given the large potential profits from long distance services, the I-LECs (from their point of view) are cooperating aggressively, making every effort to meet the law's fourteen conditions as soon as possible. This has spawned wide spread interest among many institutions to try to get into the local phone business.

By the end of 1997, the public in many areas of the country will have more than one local telephone company competing for their business. Cable television companies, electric utilities, competitive access providers, wireless service licensees, long distance providers, and various combinations of the above will all be potential entrants into the local phone service markets.

The present invention makes possible a strategy for avoiding most of the problems that threaten cash flow of telecommunication firms entering new markets, namely, that of bad debt collection. To complicate this problem further, industry reports suggest that incumbent LECs will try to dump non-paying customers on their newly emerging competitors. This fear could keep a number of prospective competitors from joining the market. (See telecom February 1997, p. 52)

The system of the present invention eliminates the non-payment problem. The software program classifies all of the customers on a fair but very conservative credit arrangement that can only be preempted by a pre-paid, or third party paid arrangement. This makes it possible to serve customers who cannot establish or fail to maintain credit.

This highly conservative credit policy protects the investments made in the C-LECs, provides for higher profit margin services, and, at the same time, provides a unique spinoff social benefit to the communities served by the C-LEC as described below. With the present invention, a universal service friendly service agreement allows users to have prepaid or third party paid phone service even when they have no credit. When individual customers are added to the phone company customer base, they can be added on a prepaid or third party paid basis. The software according to the present invention will decrement these local phone service accounts on a real-time basis and be able to switch to a third-party payer basis as the account runs out of funds.

Once the customer's pre-paid account is out of funds, only collect calls, toll free calls, sponsored calls, and exempt calls (including 911 calls) can be originated. Incoming calls will then be intercepted and callers will be asked for an additional charge if the caller wishes to complete the call. This will allow uninterrupted service to the user even though the pre-paid funds (if any) run out. This market driven solution to the universal service problem of service to those without funds to pay for service requires no tax or consumer subsidy. Each caller decides whether or not it is worthwhile to pay the extra charge for a specific call. If it is worthwhile, the customer pays. If not, the caller may decline and the call is not placed. In many cases, HUGs themselves will be able to maintain contact with clients that otherwise could not be cost effectively reached. Self-sponsored or prepaid call programs can also use this program to minimize unwanted calls while maintaining a listed phone number.

In this case, a user would maintain a listed phone number that calling parties could access and use but only by paying an additional charge. This way, a telemarketing caller would be able to make the sales call during the dinner hour but only if they pay the extra charge that goes to the account of the user. However, certain callers or sponsors could be given a pin number or other secure device to complete the call without paying the charge. The system could be used to determine which callers are sponsored by a third party so that the third party can be billed by the calling party so that neither the calling party or the called party would pay for the call.

This universal service solution would eliminate the potential problem of having poorly paying clients dumped on a new service company by the incumbent LEC. All non-paying customers could be welcomed on the pre-paid and third party payer basis without loss to the new service provider. This approach requires no income testing. Even the wealthy are welcomed to this service. This differentiator can provide substantial public policy, regulatory, political, and public relations benefits while protecting investor assets. It should also be priced to bring far higher margins than traditional telephony services.

The present invention can thus be used in a partnership arrangement between a new alternative local phone service provider and partners among hospitals, universities, and local governmental agencies (HUGs) in the transformation of their telecommunications cost centers into revenue centers. The goal of this partnership is to off-set 100% of all current costs to the partner with savings and revenue. By joining experienced partners as co-owners of an alternative local phone company, this off-set is possible without having to manage a new line of business. In effect, the operational management is contracted out to the partners.

In this application of the present invention, these resources are organized so that 10 the hospitals, universities, and government agencies (HUGs) can become C-LECs themselves rather than continuing to use the 1-LEC or purchasing a variety of services from a series of individual providers. Furthermore, this is done at a lower price for improved and more varied services than was offered by the 1-LECs.

By applying for C-LEC status, customer premises-based providers, such as 15 hospitals, colleges and universities, and local governments can turn their existing internal telecommunications networks and infrastructure into the core of their own, captive C-LEC, and realize the cost savings and operational control that this transformation brings. By expanding the C-LEC through the addition of user/customers, with whom the core provider may already be doing business, or to the local community at large, the C-LEC will be able to resell services, purchased at deep discounts, to the C-LECs customers and share in the revenue from the transactions.

When the C-LEC is expanded beyond the original customer premises base, the risk of taking on "bad debt" can be effectively eliminated through the use of pre-pay and third-party-pay applications according to the present invention, which are software-based.

This means that the C-LEC will avoid having to try to collect from customers who are unable or unwilling to pay their bills.

Processing of incoming calls to a pre-paid subscriber is accomplished in the following manner:

Step 1. Check Pre-pay Account of Called Party, as Call is Processed
  IF $, Then Connect (Give Warning if Close)
  IF $0, Then Do Step 2
Step 2. Give Message to Caller "This Call Requires an Additional $X/Min.
  "Please Press # to Accept this Charge on Your Phone Bill or Press * to Place it on a Credit Card".
Step 3. If Caller Agrees, Connect and Bill.

The Steps to Cost Reduction, Revenue, and Network Quality:

The preferred C-LEC development process using the present invention is divided into six steps:

Step One—Feasibility study—defines the technical, business, regulatory, and financial requirements, the opportunity, the partnership/team, and the time line.

Step 2—Develop Pre-C-LEC operations and submit C-LEC application. Prior to receiving authorization to function as a C-LEC, it is possible to initiate tele-management services. Tele-management activity positions the nascent C-LEC in the IS role of telephone service manager, functionally between the I-LEC and the end user. The tele-manager receives a discount on services from the I-LEC in return for management services. This provides early cost reductions. Pre C-LEC status tele-management discounts are available from the I-LECs as well as from alternate C-LECs. Business, technical, and legal advisors develop the application, review it with HUG participants, submit it and the tariff agreement to the Public Service Commission and negotiate the resale agreement with the 1-LEC.

Step 3—Commence C-LEC operations. C-LEC status makes it possible to receive the deepest wholesale discounts from the incumbent local exchange carrier thereby reducing the costs of local telephony services for the C-LEC partners to their minimum level and receive revenue for the completion of long distance calls.

Step 4—Resell C-LEC services. The C-LEC can begin to collect revenues by reselling telephony services to its business affiliates. Discounted services to business affiliates can strengthen service ties to customers while bringing in revenue that can far exceed pre C-LEC operational costs.

Step 5—Deploy advanced applications. The use of the network can be expanded through the institution of advanced applications that create value for the C-LEC user community in areas such as energy and image management, LAN/WAN management, wireless communications, fax, internet, e-mail and added voice services. The mix of advanced applications to be offered with the timing of their introduction for sale by the C-LEC is decided based upon the needs of the premises provider, the customer base and other factors. Initial applications such as energy management can be explored during the initial feasibility study phase.

Step 6—Unbundle and competitively source network elements. Specific elements of network services can be out-sourced to suppliers other than the I-LEC in order to enhance service characteristics and further reduce costs. These service elements will be available either from infrastructure-based C-LECs formed by utilities, cable companies, competitive access providers, long distance providers, and wireless licensees, or from specific service providers that will be created to serve C-LECs.

Provisioning of Unanticipated Bandwidth and Service Requirements

In an alternative embodiment, the system and method of the invention allows for the universal service user to activate unanticipated bandwidth and services on an incident-by-incident basis. For example, in the example used above, an elderly indigent patient who would not have phone service of any kind because of credit problems can be provided with unanticipated high bandwidth services free of charge to the user. The user would have access to the highest bandwidth infrastructure available, whether DSL, cable, or fixed or wireless optical services. The universal service user, who may never have received high bandwidth services, may now be able to receive unanticipated high bandwidth services. In this instance, a medical services provider may want to have home health care service staff provide in home diagnostic and monitoring services on many video and multimedia lines that might easily be the equivalent of one or more DSL or optical lines activated and provisioned to the universal service user in real time on an incident-by-incident basis.

When the medical services provider wants to establish the connection of services, the initiator of the communication will be allowed to initiate the multimedia call, be intercepted and asked for a payment arrangement. In the case of a medical services provider, a third party such as an insurer or government agency may gladly pay for the high bandwidth services since it would be far less expensive than forcing the universal service user to spend days in a hospital where the diagnostic and monitoring services would otherwise be provided and provided in what might be a less meaningful environment. However, the universal service provider will need to assess the request and determine the cost before requesting payment authorization or the provider would be forced to overcharge to be certain that costs are covered.

Determining this cost when the usage was not determined in advance, as opposed to purchasing an anticipated service that could be provisioned in a traditional lengthy time frame, would now be made possible by cost model based flow through provisioning that assesses the underlying cost of the universal service user's portion of the network, along with the core network of the universal service provider and any other network required to meet the need of the specific call. For example, in the case of long term video diagnostic services, "always on" DSL services do not allow for continued high bandwidth services because the service providers backbone networks are financially based on over subscription service assumptions.

An example a flow-based steering and cost modeling system which may be used in connection with the present invention is disclosed in U.S. Pat. No. 6,249,519, to Rangachar, the entire disclosure of which is incorporated herein by reference. Software such as that disclosed by Rangachar, and other network monitoring software (e.g., HP Open View and MicroMuse NetCool, taken in conjunction with network activation software such as NetProvision, available from Syndesis), along with network and business process modeling software (such as Viryanet), may be used to allow the service provider to the universal or sponsored service user (USSU) caller, or calling party to the USSU, to have a real-time system that tracks what networks, network services and quality of services are available at which time and duration of time for a given cost and render a price for that service in real time to the requester so that the appropriate services and connections can be rendered.

Since the universal subscription multimedia caller is making a request for service not currently activated, the flow through provisioning may include a set of business rules that allow the universal service provider to ascertain the bandwidth, speed, date, length of time, and quality of service requested and assess the unique set of costs required by the specific network elements and the market demand on those elements at that specific time. The service provider can provide rates that reflect the demand placed on its network and the networks required to enable the ongoing connection. This price, which is preferably calculated at the time that a request for data service is made, may actually change from call to call, based on market and network usage.

Based on the real time quote by the universal service provider, an entity wishing to sponsor the universal service user's request can determine on an incident by incident basis whether or not to accept financial responsibility for the activation and usage of that particular service. This becomes especially useful when the connection being requested to the end user also requires connection to one or more third parties, who are also unanticipated as to bandwidth, services, and quality of services being required.

The present embodiment also makes it possible to accommodate sponsors who wish to provide services to users on a totally free basis where the services are also activated and agreed to be paid on an incident by incident basis. This would also allow for layered services, where one service is provided by one third party (such as the cost of the communication) and another service, such as content, is paid for by another third party.

Data or Multimedia Equivalent of Caller ID and Security Check

In accordance with an alternate embodiment, a caller ID type identification means is used in a data network, whether a PSTN, internet or private network. The identification means acts as a data equivalent of ANI identifiers such as caller ID, by using digital signature or other encrypted means to provide secure identification so that data or video calls can be screened for acceptance and or charges.

One step would check to see whether the digital signature is present. If not, the message can either be sent to a proxy, policy, or security server for inspection and processing, or rejected altogether.

Once accepted, the security information, such as digital signature information, is used in conjunction with a database of verified data, such as digital signatures, which then makes use of the verified information to be presented to the user so that determinations can be made as to whether and how the call or request should be routed. In this respect, see below for services requests, follow me and follow my information services. The identification means preferably shows who the user is along with identifying information such as addresses, affiliations, and contact information. This information may then be compared to a second database which maintains other information from the caller so that the user can then determine whether to accept the communication, reroute it, or release information requested by it.

Follow Me Email, Data, Multi-Media

These data identifiers make it possible for the message to be redirected or replicated to other locations. The secured and verifiable identifiers also make it possible for the transaction to be accomplished by proxy through business rules or other automated agents whose activities or services are paid by third parties.

Often, a caller does not necessarily need to reach a person to hold a conversation, but, merely needs to obtain information. Given the proper security, these requests for information can be redirected and completed without requiring an in-person conversation. This would be a "follow my information" service that would be possible because of the combination of the third party billing capability available with the secured identification capability built into the method. This helps provide screening and directory services in order to determine if the communication should be accepted, declined, redirected, or paid by other parties.

Security Advantages

Since the caller is be forced to make secure identification, the called party is generally more willing to accept the communication knowing that the caller is trusted or findable and prosecutable if necessary and, paid by a secure third party. This would be useful to minimize or block unwanted emails or communications likely to be contaminated with viruses. This also makes it possible to use the identification inherent in the digital signature or other encrypted elements used as identifiers to route the call whether or not it is in a header, or route the call if sent to an intelligent peripheral such as a proxy, policy, or security server which forwards or redirects the communication when it met the directory requirements for secured or approved communications.

The present embodiment further makes it possible for data transmissions that contain data, voice or multimedia to be transmitted as if they were traditional PSTN communications. These may also be used as tunneled communications within communications such as a virtual private network which has its own billing, directing, and security provisions. This allows for multiple services to be contained within a communication with multiple authentication and billing services to be attached to each as they are used.

This further makes it possible to create security throughout the network not just at a firewall point. With these securable identifiers, the identifiers could be checked throughout the stream of communications and routed for law enforcement uses, as well.

Secure and Verified Identifier as Follow Me or Follow My Information Service A further embodiment provides the ability for communicators to automatically populate directories that can provide up-to-the-moment location information, contactability status, and updated security information. This also allows communicators to communicate through intelligent agents which can communicate with each other and provide the information communicators need from each other without having to actually be interrupted with a communication that requires live voice interaction.

The incoming call can be a request for further data that does not require the actual called party to speak. But, given the securable identification of the calling party, the calling party identification can be used to determine what type of data can be shared with the calling party by means of business or communication rules once the calling party is authenticated and authorized.

Layered, Tunneled Billing, or Sponsored Billing

Another advantage of third-party billing capabilities for data or multimedia calls includes the ability to have layered billing so that a sponsor can provide free transport to the user while one or more third party sources pay for separate services or layers of services for the user.

The calling party may be making the call with a caller ID, or a data or multi-media communication with a digital signature verifying identity and billing relationship to a third party who will pay for the underlying communication. Within that communication may be additional communications or transactions for services paid by other parties whose relationships to the caller are different. For example, a bank may sponsor free connectivity subscriptions for a user while charging a third party for financial services such as crediting payments for services. Each additional service or layer of services may be billed to different parties and the specific relationship could support its own digital signature.

A universal service user may have a digital signature or other security measure with a sponsoring communications provider that is different from the caller's relationship with an employer, or government agency providing services. This way, the caller may create a secured relationship with an entity without compromising privacy, security, or data base integrity interests of the other party.

Thus, there has been disclosed a significantly improved system and method for controlling access and billing to provide universal local and distance telephone service, as well as access to other communications networks. While the invention has been particularly shown and described with reference to a preferred embodiment thereof, it will be understood by those skilled in the art that various changes in form and details may be made therein without departing from the spirit and scope of the invention.

The embodiments of the invention in which an exclusive property or privilege is claimed are defined as follows:

1. A method for operating a central office switching system, comprising the steps of:

detecting an incoming call from a calling party to a called party;

using a called number to determine whether said called party is a universal service user for whom service is provided at no charge or substantially no charge;

generating and sending a message to said calling party requesting authorization to charge said calling party an additional fee for connecting said calling party to said called party;

receiving user input from said calling party indicating said calling party's authorization of said additional charge; and, connecting said calling party to said called party.

2. A method of operating a telecommunications device, comprising the steps of:

using said telecommunications device to detect an incoming call from a calling party to a called party;

using a called number to determine whether said called party is a user for whom service is provided at no charge or substantially no charge;

generating and sending a message to said calling party requesting authorization to charge said calling party or a third party an additional fee for connecting said calling party to said called party;

receiving user input from said calling party indicating said calling party's authorization of said additional charge or authorization of a third party funding source designated by either the calling party or by the called party on an interactive or pre-provisioned basis; and, connecting said calling party to said called party.

3. The method in accordance with claim 2, further including the step of:

determining whether sufficient funds exist in a pre-paid account, of the calling party, the called party or a third party, to cover charges associated with said call.

4. The method in accordance with claim 2, wherein said step of using a telecommnunications device comprises the step of using a central office switch.

5. The method in accordance with claim 2, wherein said step of using a telecommnunications device comprises the step of using an intelligent peripheral connected to a central office switch.

6. The method in accordance with claim 2, wherein said step of using a telecommunications device comprises the step of using a PBX.

7. The method in accordance with claim 2, wherein said step of using a telecommunications device comprises the step of using a network device for wireline local loop service.

8. The method in accordance with claim 2, wherein said step of using a telecommunications device comprises the step of using a network device for wireless local loop service.

9. The method in accordance with claim 2, wherein said step of using a telecommunications device comprises the step of using a network device for wireline long distance service.

10. The method in accordance with claim 2, wherein said step of using a telecommunications device comprises the step of using a network device for wireless long distance service.

11. The method in accordance with claim 2, wherein said incoming call is a voice call.

12. The method in accordance with claim 2, wherein said incoming call is a data call.

13. The method in accordance with claim 12, wherein said data call contains multimedia content.

14. A method for provisioning data services to customers, comprising the steps of:

receiving a request from an initiating party to conduct data communications with a receiving party at a specified time;

determining whether said receiving party is a universal or sponsored service user for whom service is provided at no charge or substantially no charge;

calculating a cost for provisioning a quality of service necessary to support said requested data communications at said specified time, generating and sending a message to said initiating party requesting authorization to charge a fee for connecting said calling party to said called party;

receiving user input from said initiating party indicating said initiating party's authorization to charge said fee; and, provisioning data services to support said requested data communications at said specified time.

15. The method in accordance with claim 14, wherein said step of calculating a cost for provisioning a quality of service comprises a step of assessing the network elements and quality of service necessary to support said requested data communications.

16. The method in accordance with claim 15, wherein said step of calculating a cost for provisioning a quality of service further comprises a step of assessing a market demand on said network elements at said specified time.

17. The method in accordance with claim 1, wherein said step of determining whether said called party is a universal service user comprises the step of using a secure identifier.

18. The method in accordance with claim 17, wherein said secure identifier comprises a PIN code, digital signature, pseudo-random number generator, biometric or video transmission.

19. The method in accordance with claim 2, wherein said step of determining whether said called party is a universal service user comprises the step of using a secure identifier.

20. The method in accordance with claim 19, wherein said secure identifier comprises a PIN code, digital signature, pseudo-random number generator, biometric or video transmission.

21. The method in accordance with claim 14, wherein said step of determining whether said receiving party is a universal or sponsored service user comprises the step of using a secure identifier.

22. The method in accordance with claim 21, wherein said secure identifier comprises a PIN code, digital signature, pseudo-random number generator, biometric or video transmission.

* * * * *